United States Patent [19]
Clever

[11] 4,145,715
[45] Mar. 20, 1979

[54] SURVEILLANCE SYSTEM

[76] Inventor: Eric C. Clever, 29 Estaugh Ave., Haddonfield, N.J. 08033

[21] Appl. No.: 753,588

[22] Filed: Dec. 22, 1976

[51] Int. Cl.² .............................................. H04N 7/18
[52] U.S. Cl. .................................... 358/108; 358/125; 358/210; 358/903
[58] Field of Search ................ 358/108, 125, 210, 903

[56] References Cited
U.S. PATENT DOCUMENTS 3,935,380  1/1976  Coutta ................................... 358/108

Primary Examiner—Robert L. Richardson
Assistant Examiner—Edward L. Coles
Attorney, Agent, or Firm—Morton C. Jacobs

[57] ABSTRACT

This surveillance system employs a closed circuit television camera or cameras used in conjunction with an electronic cash register or registers employed at one or more point-of sale stations. Combined images of transaction items viewed by a camera at a given station and transaction data (such as prices) rung up on the cash register at said station are presented on a television monitor. Signals for these combined images are also stored on video tape together with coded signals related to transaction data to achieve computerized editing.

10 Claims, 10 Drawing Figures

SURVEILLANCE SYSTEM

BACKGROUND OF THE INVENTION

1. Field of the Invention

This invention relates to a surveillance system and particularly to such a system suitable for a point-of-sale transaction station.

2. General Description of the Prior Art

High-volume retail stores have suffered from point-of-sale shrinkage, ranging as high as several percent of the retail value of the goods handled. The invention of the cash register resulted in the virtual elimination of direct theft of cash by employees. The introduction of direct control over cash meant that point-of-sale shrinkage could only occur by falsifying the true value of a transaction. One common method employed in the alteration of a transaction is for the cashier to enter into a prior agreement with a customer to ring up less than the true values of the items in the customer's order (under-ringing) or not to ring some items at all (no-rings).

Obviously, to detect these forms of theft more information must be kept on each transaction than is preserved on a cash register tape.

The installation of a closed circuit television system has an initial chilling effect on under-ringing and no-rings. But when the cashiers realize that there is no direct association between what is being rung on the cash register and what is being passed across the counter, the effectiveness of the system decays and losses tend to go back up to near their previous values. The use of two cameras, one aimed at the counter where goods are being placed and the other aimed at the cash register display, with the signals from the two cameras mixed together with a special effects generator, allows a specific set of transactions on a cash register to be associated with a specific set of goods going across the counter. In one system the two cameras are appropriately aimed and deployed on a rail (U.S. Pat. No. 3,935,380). It has been found that such a two-camera system does not work well for electronic registers where displays are light emitting diodes or liquid crystal displays, and it tends to store large quantities of detailed video information which cannot be readily abstracted for monitoring by an operator. With the present state of the art (scene analysis) it would be technically and economically infeasible to edit and process (by computer) the video data for any particular pattern of activity (such as for the manager to call for all records on a certain class of transactions or total sales).

Accordingly, it is an object of this invention to provide a new and improved surveillance system.

Another object is to provide a new and improved surveillance system for a point-of-sale transaction station.

Another object is to provide a new and improved surveillance system for use in commercial establishments with multiple point-of-sale transaction stations.

Another object is to provide a new and improved surveillance system capable of storing video information which is edited in accordance with prescribed criteria.

Another object is to provide a new and improved surveillance system for point-of-sale stations that supplies the video records on specified classes of transactions, which can be done with the present inventions.

SUMMARY OF THE INVENTION

This surveillance system employs a closed circuit television camera and a television monitor. A combined image of the physical nature of the transaction items passing at a point-of-sale station within the view of the camera, together with a large video display of transaction data such as prices being concurrently rung up on the cash register, are presented on the monitor.

In accordance with this invention, a surveillance system for point-of-sale transactions comprises a television camera or cameras for developing frames of video signals representative of transactions at a transaction station or stations. At least one digital device (such as a cash register) at each station develops binary electronic signals representative of the data of particular ones of the transactions. A video display device, such as a television monitor, displays image frames of the transactions corresponding to and from associated frames of composite signals that are developed. The composite signals are a mix of the transaction video signals and a set of video character signals generated from the binary data signals associated with the frame of transaction signals. The means for generating the video character signals operates to position the associated character images on said display device in a certain location with relation to the associated image frames of the same transaction.

The composite video signals are recorded on a storage medium such as magnetic tape. An edited recording of salient or specified classes of transactions is developed by processing the data signals in accordance with certain criteria.

BRIEF DESCRIPTION OF THE DRAWINGS

The foregoing and other objects of this invention, the various features thereof, as well as the invention itself, will be more fully understood from the following description, when read together with the accompanying drawings in which.

In the drawings corresponding parts are referenced throughout by similar numerals.

DETAILED DESCRIPTION OF THE INVENTION

Figure 1:
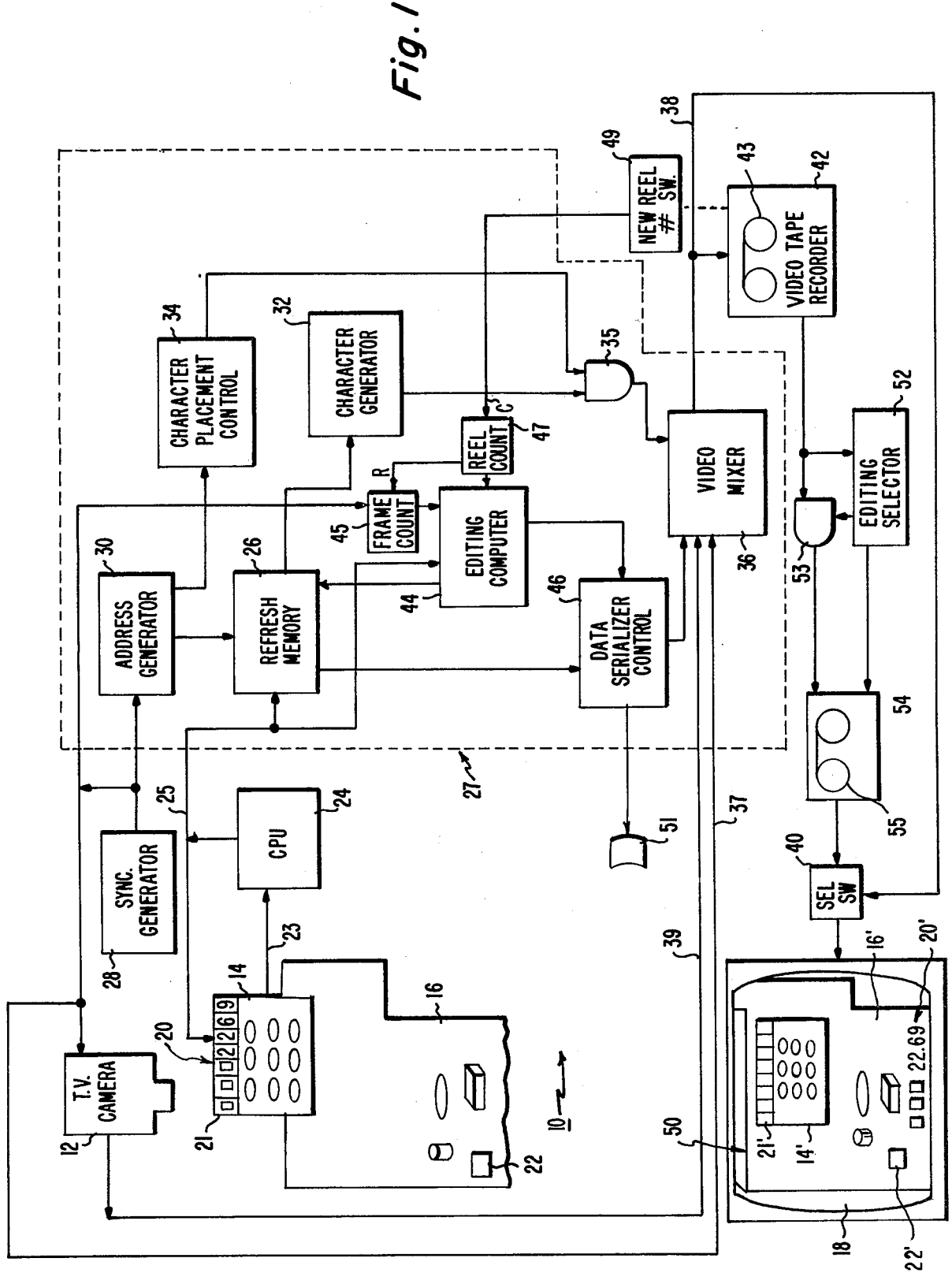
FIG. 1 is a schematic block diagram of a surveillance system embodying this invention.

The surveillance system 10 of FIG. 1 employs a closed circuit television camera 12 in conjunction with an electronic cash register 14 (or similar point-of-sale registering device for charge accounts). The register is employed, for example, at each of a plurality of point-of-sale stations 16 such as a check-out counter of a supermarket or fast food restaurant. Presented on a television monitor 18 is an image 22' of the physical nature of the transaction items 22 passing at the station 16 together with a large video display 20' of the transaction data 20 such as prices being concurrently rung up on the cash register 14. In FIG. 1 the items in the video image of monitor 18 are referenced by the same numerals as those at station 16, but with the addition of a prime (').

With such electronic cash registers, there is generally associated a central processing unit (CPU) 24. A separate CPU (e.g. a programmed micro-processor) may be used for each cash register, or one CPU may service a plurality of such cash registers at individual point-of-sale stations. Digital combinatorial signals from the cash register for each transaction (i.e. each of the items in an order) rung up by the operator are supplied on line 23 to the CPU, which in turn produces as combinatorial outputs on line 25 the appropriate signals for displaying the individual transaction amounts 20 (or subtotals or totals) in the display 21 of each cash register. These CPU output signals are also supplied as inputs to a control device 27 used to develop and interrelate video signals representative of the digital data for display by the monitor.

The control device 27 includes a refresh memory 26 that receives the digital data signals for storage. A synchronizing (sync) generator 28 is employed for the entire system and supplies signals for synchronizing the television camera 12 as well as the monitor 18. These synchronization signals are also used as inputs to an address generator 30 which successively develops the appropriate address locations for storing in memory 26 the digital data signals supplied from the CPU. Thereby, the data of successive transactions making up an order are stored at the successively addressed memory locations. The digital data outputs of the refresh memory are supplied to a character generator 32 which generates appropriate video signals that are representative of that digital data and that are used to produce a visual display of the transaction data in monitor 18. These video signals from the character generator 32 are directed through gate 35 to a video mixer 36 under the control of a signal from a character-placement control 34 (which develops its placement control signals from the address-generator signals).

Also supplied to the video mixer 36 are the video signals from the television camera on line 39 and the synchronization signals from the sync generator on line 37. A time-date generator can also be added to the system; it functions like another terminal feeding the video mixer. The output of the video mixer on line 38 is a stream of frames of video, with each frame being a composite of the video and sync signals from the camera 12 and generator 28 and the character signals from generator 32. This set of signals is supplied via a selector switch 40 for on-line operation of the monitor 18. In addition, the composite signals of each frame of video are recorded on a reel of tape 43 of a video tape recorder 42.

An editing computer 44 receives the digital transaction data by way of a direct line from the cash register CPU 24. Alternatively, this data could pass to the editing computer 44 by way of the refresh memory 26. The editing computer also has associated with it a frame-count register 45, which counts frames by counting the Y-reset pulses from the sync generator. This count register 45 is reset by a signal generated by a switch 49 each time a new tape reel 43 is inserted into the video tape recorder 42. The generation of that reset pulse is also used as a count signal for a reel count register 47 associated with the editing computer 44. Thereby, the editing computer has available to it the number identifying each frame as well as the number identifying each reel which has been inserted in the recorder 42. In addition to generating the transaction data such as prices, totals, and subtotals, the CPU 24 may supply identifying numbers such as those for the transaction item's store department, order and transaction sequence and clerk and cash register. Alternatively, the editing computer may be used to generate these identifying numbers.

The output of the editing computer is supplied to additional sections of the refresh memory 26. The refresh memory supplies to the character generator 32 those portions of the transaction data which are to be displayed on the monitor, which may include the price as well as identifiers such as the department number. The remainder of the information not needed for the monitor display 18 is supplied to the data serializer control 46 for digital recording in the leader area of the video frame 50 in the vertical interval or during the vertical blanking period.

The editing computer 44 also stores all transaction data and identifiers in a suitable accessible file structure for processing, either on-line or off-line; it is structured to determine in accordance with pre-set criteria whether all or some of the transactions of a particular order or set of orders should be selected for an edited tape recording associated with a particular clerk or station. This computer determination generates as an output a selection or rejection identifier for each transaction that is also recorded by recorder 42 in the leader 50 of the associated video frame along with the video of that frame.

When the computer 44 performs its processing in the off-line mode, it generates as an output a look-up table 51 containing the selection and rejection identifiers in association with the transaction and order identifiers so that off-line editing can take place. This look-up table 51 may be a print out as well as signal store for controlling subsequent editing. Preferably, the same kind of look-up table is the computer output in the on-line mode.

The full record tape 43 of recorder 42 (which contains both the selected and rejected frames) is edited by an edit selector 52 which controls (in accordance with the selection identifiers for the successive video frames) an analog gate 53 to pass the signals of a video frame that is read by recorder 42 from its full tape 43 to an edited tape 55 of a second recorder 54. The edit selector 52 (which may be a suitably programmed microprocessor) operates off-line with the look-up table 51 containing the selection and rejection identifier signals. The transaction identifiers in the leader 50 of each frame from the full tape of recorder 42 are read and used by selector 52 to find in the look-up table the associated identifier for selection or rejection. If selected, the associated video frame is recorded on the edited tape 55 of the second video recorder 54; if rejected, that frame is simply not rerecorded on the edited tape. Thus, the edited tape 55 recorder 54 contains only those frames which meet the pre-set criteria, and presents but a fraction of the total of recorded frames on the full tape 43. With operation of selector switch 40, the edited tape may be displayed on monitor 18 and reviewed in a fraction of the time required for review of all of the recorded transactions. Moreover, the edited tape contains only those transactions which experience would have shown to be deserving of a detailed review by the user.

In operation, the data signals of each transaction rung up on register 14 are generated with appropriate identifiers and handled digitally in accessible files of the editing computer 44, which determines whether the editing criteria are met and generates selection and rejection identifiers for each transaction of each order. All of this digital information (transaction data and identifiers and editing identifiers) is combined (via serializer 46 and mixer 36) for recording with the video from the camera 12. The digital information is stored in the leader 50 of each frame and does not affect the video information or image of the frame. The digital data are converted to suitable video signals for display purposes by character generator 32 and supplied to the mixer 36 by placement control 34 to locate the price display consistently in a proper portion (e.g. in the lower right-hand corner) of each video frame. All of the video frames can be monitored on-line and directly via line 38 and selector switch 40. Alternatively, the edited tape 55 of the selected frames from recorder can be monitored via switch 40. In one mode of use, the contents of the edited tape 55 are displayed and reviewed by the user to locate any set of transactions or orders that suggest a more extensive review of some or all of the transactions or orders for the particular register or sales clerk in question. Thereupon, the full tape 43 is available for such review.

In one specific form of the invention (FIG. 2) the output 25 of the register CPU 24 includes four binary-signal lines 61–64 (e.g. for the successive binary coded decimal (BCD) characters to be displayed at the register display 20) and S/D and S/I control lines 65 and 66, respectively. An enabling clock signal on the S/D line 65 occurs concurrently with the price data signals on lines 61–64, all generated as the outputs of the register CPU 24. In addition, also appearing on those lines 61–64 at a different time with a control signal on the S/I line, but also in BCD form, is an identification of the serial decimal digit then being supplied by the register CPU. For example, such a cash register may typically display seven decimal digits for a particular transaction (five dollar digits and two cents digits); the BCD signal combinations for those seven decimal digits are supplied as a series of decimal digits. The S/I control line 66 identifies which of seven digits is then being supplied from the CPU to the display so that the digit is positioned in the correct sequence on the display.

Figure 2:
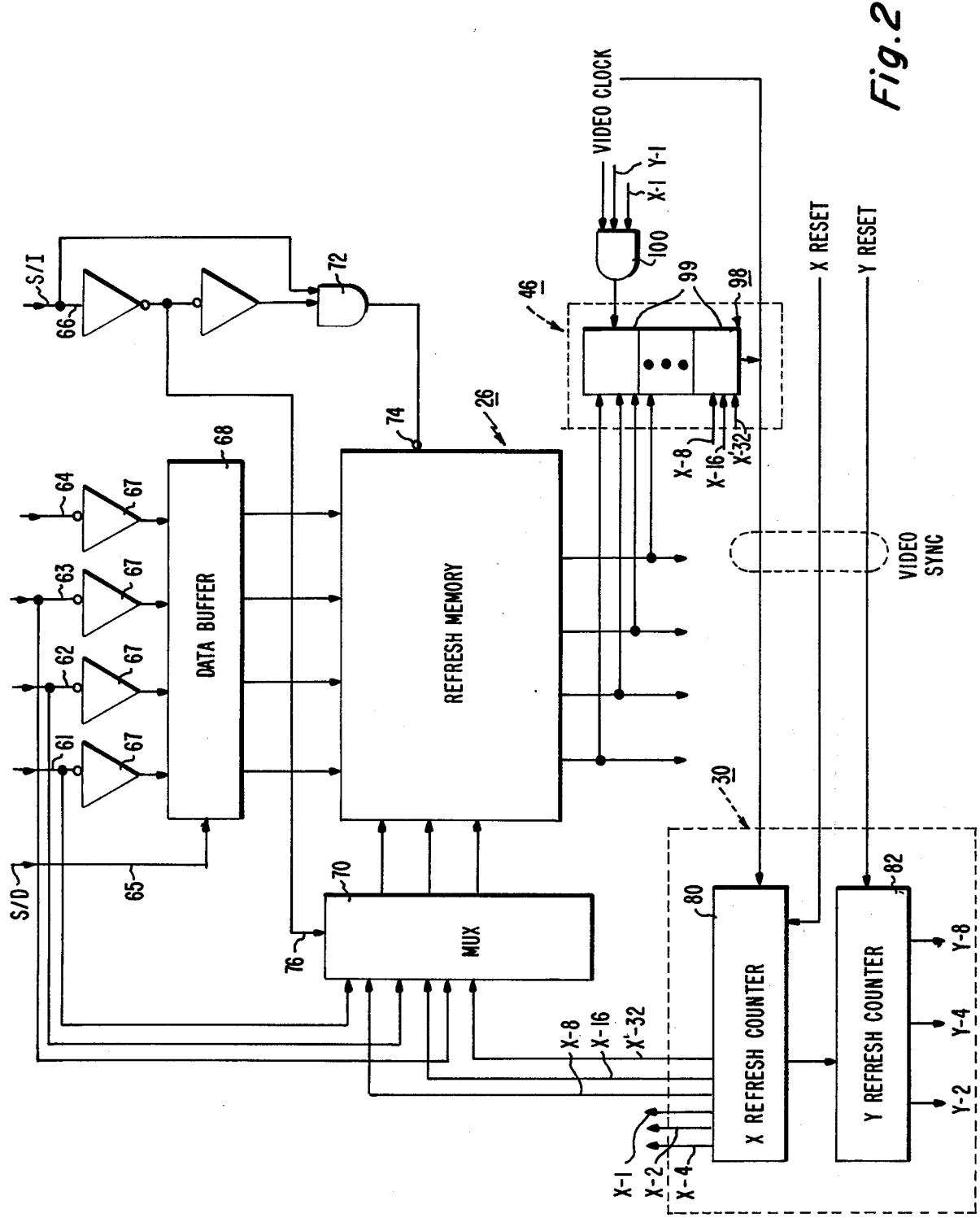
FIG. 2 is a schematic block and logic diagram of portions of FIG. 1.

As shown in FIG. 2, the loading logic for storing these BCD price digits in the correct sequence in the refresh memory 26 includes a latching buffer register 68 to the inputs of which the four data lines 61–64 are connected via individual inverters 67. Buffer 68 also receives loading signals from the strobe data line S/D at the clock input of this buffer 68. The three most significant digit lines 61–63 are also supplied via an address-generator multiplexer or MUX (i.e. a set of digital gates) to the address input terminals of the refresh memory 26. The latter receives at its data input terminals the respective outputs of the buffer 68. This refresh memory also receives on its read-write input terminal a signal developed from the strobe-identifier signals on S/I line 66 control. The strobe signal on S/I line 66 is passed via two inverters to a gate 72 as well as directly to that gate (i.e. bypassing the inverters) to develop a Write signal which is somewhat delayed from the original strobe signal. The strobe signal is also supplied via one of the inverters to the select input 76 of the MUX 70. When input 76 is active, the combinatorial signals from lines 61–63 determine the addresses for writing price data in memory.

The address generator 30 includes an X-counter 80 that receives the video clock pulses as inputs from the video's sync generator 28; the latter generates standard television sync waveforms including a 2.52 MH$_Z$ pulse train for a master clock. The X-counter 80 also receives the X-reset pulse of the video sync, which corresponds to the end of the TV raster line of a video frame. The X-counter 80 divides the video clock by 160 and supplies its overflow pulse as an input to a Y-counter 82, which also receives the Y-reset signal corresponding to the end of a video field. Thus, the Y-counter counts the number of lines in a field; it divides by 262.5, which corresponds to 525 video lines per video frame containing two fields in accordance with the usual U.S. standard. The X-counter counts the video clock pulses, which count corresponds to the number of 400 nanosecond picture elements (pixels) that form a video line.

The MUX 70 of the address generator receives as gating inputs the X-counter outputs for X-8, X-16, and X'-32. The combination of these gating inputs determine the successive addresses for reading the contents of the refresh memory 26; thereby, the reading of the memory is synchronized to the television scanning operation. The memory read-out, controlled by the X-counter outputs, is repeated for each scanning line; but the utilization of the memory outputs is controlled by the Y-counter outputs (as explained below) at chosen scanning lines in a video frame.

In operation, the price data signals developed by the cash register CPU appears on the data lines 61–64 concurrently with the strobe signal on S/D line 65, so that the data signals are latched in the buffer 68.

Thereafter, the cash register CPU increments its digit identifier, which combinatorial signals appear on the digit lines 61–64 concurrently with the strobe signal on the S/I line 66. That S/I signal is effective to steer the digit identifier signals through the MUX 70 and thereby pass the digit identifier signals as the address to the refresh memory 26. That S/I strobe signal, slightly delayed, then generates the Write signal at terminal 74, which insures that the data latched in the buffer 68 is stored at the proper address location in the refresh memory.

In a similar fashion, the set of BCD signals for each numeric character that are generated by the register CPU is set up in buffer 68 by the concurrent S/D strobe signal, and thereafter is stored in the memory 26 under control of the associated S/I pulse at a memory address corresponding to its position in the sequence of characters that compose the price. Whenever the S/I pulse occurs, the memory 26 is set for the writing operation. Thereby, each BCD character from the CPU is written in memory. Otherwise, the memory is normally in a "read" mode, and the set of BCD characters that compose the transaction data are read repeatedly during each scanning line of a video frame at the times determined by the combinations of X signals used for read addresses.

Figure 3:
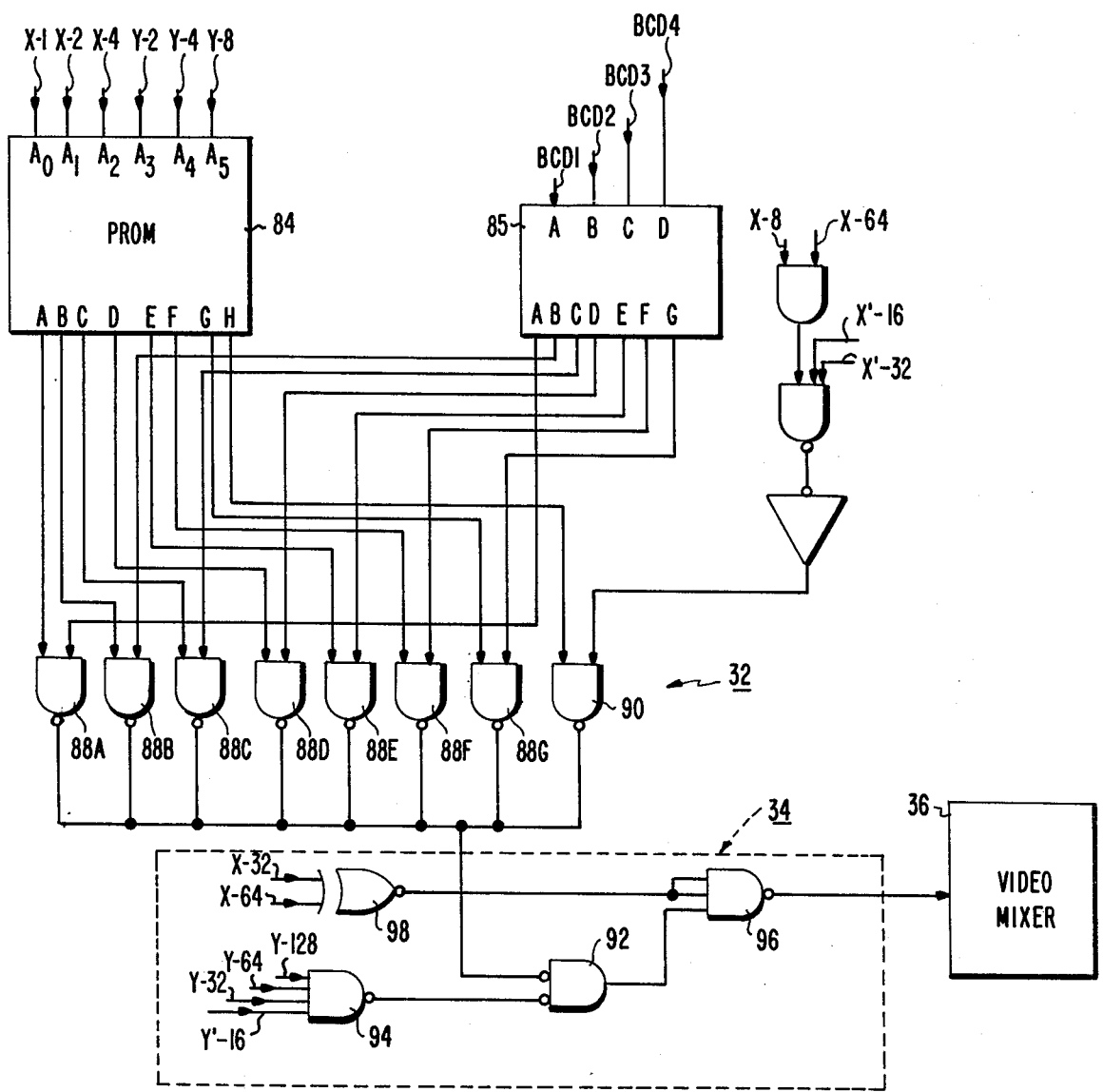
FIG. 3 is a schematic block and logic diagram of other portions of FIG. 1.
Figure 4A:
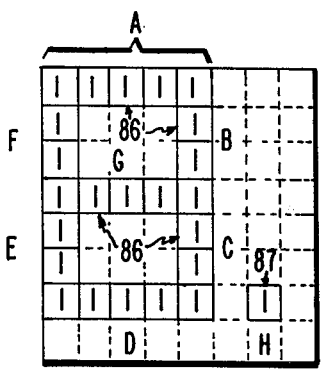
FIGS. 4A and B are schematic diagrams of a segmental character and a segment thereof, respectively, employed in one embodiment of this invention.
Figure 4B:
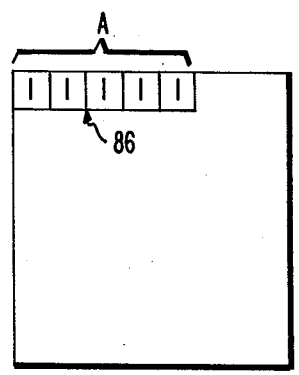

One suitable form of character generator 32 (FIG. 3) consists of a read-only memory 84 (such as a PROM). The latter contains, in this illustrative embodiment, eight arrays of memory locations, each eight-by-eight, and containing a configuration of stored 1's and 0's corresponding to the segmental character to be formed. All eight segments are shown combined in FIG. 4A; one of the segments (labelled A) is shown in FIG. 4B, which represents the storage pattern of one array. A separate storage array is provided for each of eight segments 86, 87. That is, by way of example, a character-format of seven segments 86, plus a decimal point 87 is used; in FIG. 4A the segment letters A to H identify the segment positions corresponding to those generated at the outputs of the read-only memory 84 (FIG. 3). The addresses of the read-only memory are a three-bit X-code and a three-bit Y-code supplied from the outputs of the X and Y refresh counters 80 and 82. The Y counter outputs are Y-2, Y-4 and Y-8, in order that a double thickness line be produced for each portion of the character. Accordingly with the PROM storage configuration is effectively that of eight templates (the seven possible segments 86 of a typical segmental character plus the eighth segment 87 of the decimal point). The character block is eight scanning lines high and eight pixels wide. To store eight different character segments, the PROM contains in the array of the A segment the eight-by-eight pattern of 1-bits shown in FIG. 4B (the remaining memory locations contain 0-bits). Thus, for each character block generated during the repetition of the three X-counter outputs and the corresponding three Y-counter outputs, a combination of 1-bit signals appears on the output of the read-only memory. Similarly, a separate PROM array is provided for each of the other seven segments B to H, and the associated signals are generated at the respective B to H outputs. These 1-bit signals correspond to pixels of a video character to be displayed and identify where the various portions of a character are formed; because the television display is a dynamic one, these 1-bits are essentially "when" signals. Thus, the read-only memory 84 provides a repeated character scan for developing the potential character segments to be displayed at the individual locations associated with those segments. The BCD data signals from the refresh memory 26 for each of the characters to be generated are sent as inputs to a converter 85 for converting this BCD code to a seven-segment character code. The a to g outputs of the converter 85 identify which of the seven-character segments 86 is to be displayed at any particular instant. The outputs from the converter are combined with corresponding when-outputs from the conin a set of seven gates 88A to G. Another gate 90 receives the decimal point output H from the PROM, together with a signal which is timed always to following the sixth decimal digit; that is, it is generated by the combination of X-8, X-64, and X'-16 and X'-32 for one particular line and pixel position at which the decimal point is to be displayed. Thus, this eighth gate is always enabled just before the seventh and eighth digits and thereby produces the decimal-point display that separates dollars and cents.

The outputs of the character generator 32 gates 88 A to 88 G and 90 are wired together in an OR configuration and supplied as the video inputs to control gate 92 which receives an enable signal from a Y locator gate 94 of the placement control 34. Gate 94, in turn, receives a programmable combination of Y-counter outputs (e.g. Y'-16, Y-32, Y-64, Y-128) to determine the vertical location of the character displayed on the monitor screen 18. The output of the gate 92 is supplied as the video input to another control gate 96 which receives an enable signal from an X locator gate 98. The latter is an exclusive-OR gate and, in turn, receives as inputs a suitable combination of X-counter outputs (e.g. X-32 or X-64) which determine the horizontal position of the characters to be displayed. The output of the gate 96 is supplied to the video mixer 36 where it is amplified and set to an appropriate brightness level (for example, by an adjustable clamping circuit). The mixer also receives the video signal from the camera 12, and its output drives the monitor display 18 and is also recorded on a video tape 43 by recorder 42. The illustrative locator combination of X-32, X-64 and Y'-16, Y-32, Y-64, Y-128 positions the price pixels in the bottom center of the video frame, as indicated in FIG. 1.

The data serializer 46 (FIG. 2) includes a shift register 98 that receives the BCD data signals from the refresh memory 26. The shift register has a plurality of BCD stages 99, and the register bits of each BCD digit are transferred in parallel to a different stage. Successive BCD digits are transferred to successive stages of the shift register, and these BCD digits are steered to the corresponding shift register stages by the corresponding X-counter outputs that address the successive memory locations to read out those digits. The video clock converts this assembled stream of BCD digits to serial form. In addition, a parity generator (not shown) may add one or more parity bits. This BCD data is read out of the refresh memory 26 repeatedly over each field of video display, as explained above. However, this BCD data is written in a specified location so that it can be appropriately detected for use in the subsequent editing operation, for example, in the very first line (Y-1) of the field and starting in a specified X position (X-1) of that line. These outputs from the X and Y counters enable a gate 100 only in the specified line beginning at the X-1 pixel position of that line. The shift register stages 99 receive the BCD digits during the last line of a frame. As specified by the X-1 and Y-1 signals, on the first line of the following frame the video clock is used for shifting out serially from the shift register. During this shift out, the shift register input gates are closed.

The serial BCD output is supplied as bits to the video mixer 36. The latter, for the 1 bits, clamps the video to a high voltage level that is above the highest video voltage level used for the camera video display. Thereby, the recorded BCD data signals when read out exceed a threshold above the highest video image signals and are thereby readily discriminated from the video image. Moreover, when these data signals are read they are also readily identified by their location in the signal stream following the end of a frame. When these BCD data signals are later read for display on monitor 18, the BCD data signals are so located in a leader area 50 as not to impair the video image.

Where the cash register CPU 24 supplies other data, such as identifiers for transaction, order, station and sales clerk, this information may also be set up in sections of the refresh memory, in a similar fashion, and read out for recording in the leader of each recorded video frame.

Figure 5:
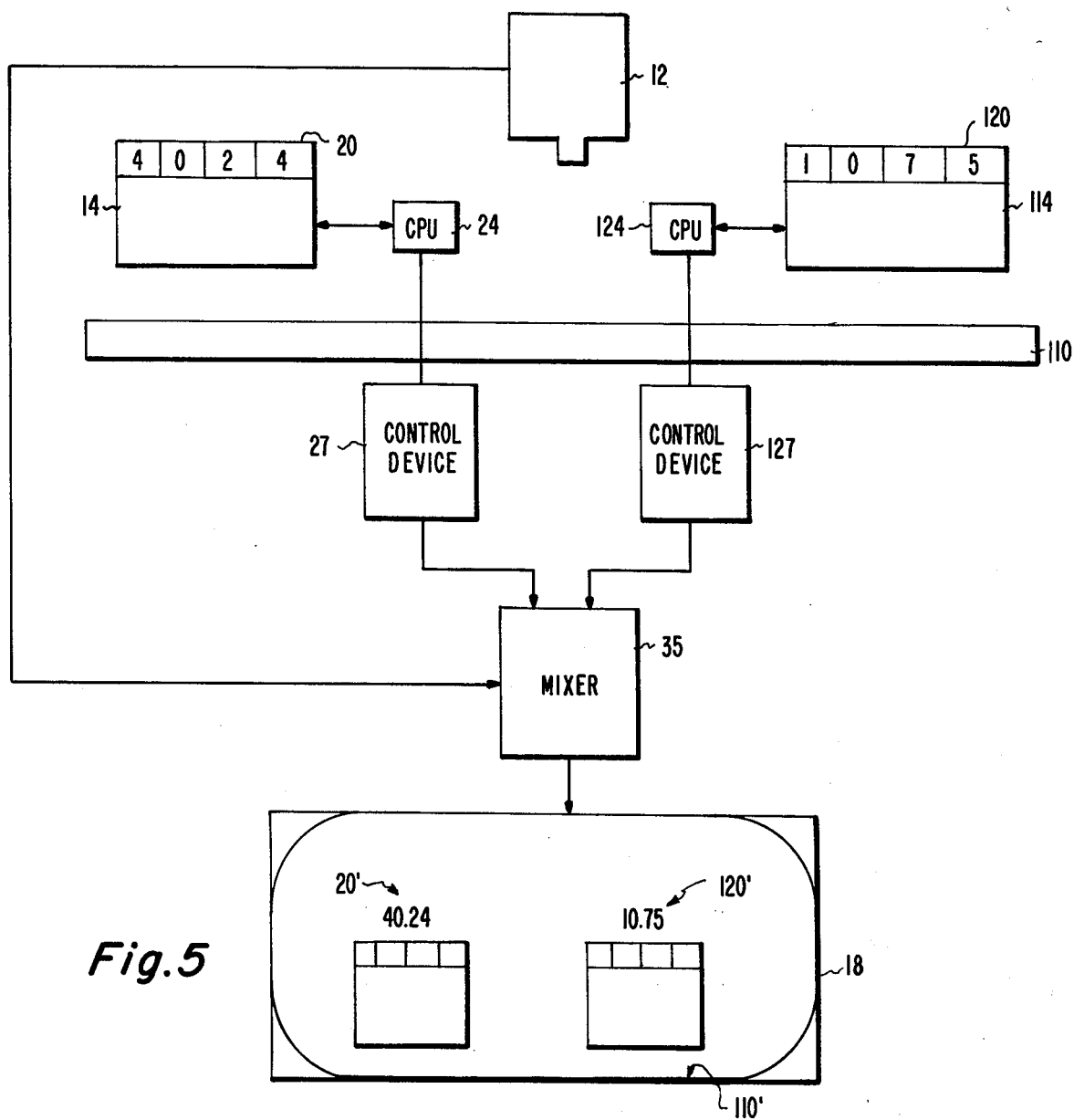
FIG. 5 is a schematic block diagram of another system embodying this invention employing a plurality of cash registers and a single camera.

There are several possible configurations for a surveillance system. One such arrangement calls for a single camera to scan several point-of-sale stations. Where a plurality of cash registers 14 and 114 (FIG. 5) are employed, separate control devices 27 and 127, respectively, may be provided for each register. The character placement control 34 of each control device 27 and 127 is programmed to position the associated visual displays 20' and 120' in a different portion of the video frame, e.g. at different pixel positions set by different X values for the X-locator gate 96 or on different scanning lines set by different Y values for the Y-locator gate 92. The transactions performed at a plurality of registers 14, 114 are covered by the field of view of the single camera 12, for example, where they are physically assembled on a single sales counter 110. The monitor 18 provides a combined image of all of the transactions on sales counter 110, and the visual displays 20' and 120' of the transaction data from the two registers is large, clear and unbiguous.

Figure 6:
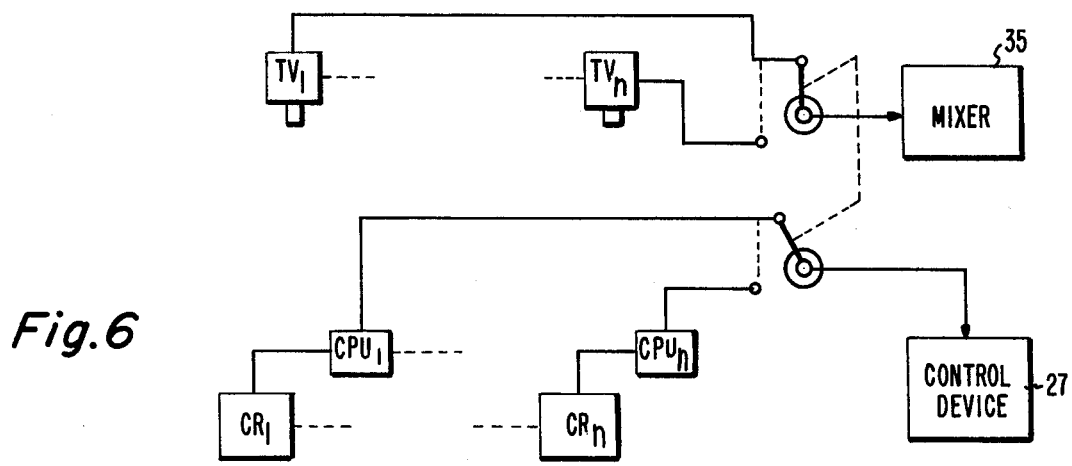
FIG. 6 is a schematic block diagram of another system embodying this invention and containing multiple cameras and cash registers with one control device.

FIG. 6 illustrates a system configuration employing multiple cash registers and multiple cameras. In this embodiment of the invention the manual selector switches for the camera and registers are ganged together so that cash register n is always selected with corresponding camera n. In this arrangement each cash register has its own CPU but, since only one camerareg- ister pair is selected by the user at a given time, it is possible to utilize a single control device.

In another system configuration employing multiple cash registers and multiple cameras, a computer controls the selection of a cash register and its associated camera and their coupling via a common central controller and video mixer to the output monitor and video recorder. In such a system all the cash registers communicate via a data link (typically an asynchronous UART that meets IEEE standards) to the single central controller. In this case, the video signals from the cameras also go through this controller rather than directly to the video mixer.

This controller formats the cash register data and mixes it with the video data. As each character is received from a cash register, the control program of the computer (e.g. a programmed microprocessor) checks to see if the character is from the cash register which is being monitored at that instant, and whether or not it is part of the data from a transaction from the cash register. If the character does not satisfy these criteria, the control program ignores the character. If the character is to be used, it is encoded (e.g., if it is going to be displayed it might be translated from BCD to ASCII code) and arranged in proper sequential order. When all the characters from the transaction have been received, the computer transfers them from a working buffer in the computer's memory to their proper locations in the refresh memory. Thereafter, the common video electronics operate on a time-shared basis for all stations, in the manner described above.

Another system configuration utilizes one camera which moves on a rail to scan a cash-register station selected by the user. The camera output is always supplied to the mixer, and the selection of a station to be monitored also selects the cash register and its CPU to be connected to the control device 27. Another system configuration employs multiple cameras and registers and the number of cameras is less than the number of transaction stations under surveillance, for example, where a camera may be used for a plurality of stations as in FIG. 5.

Figure 7:
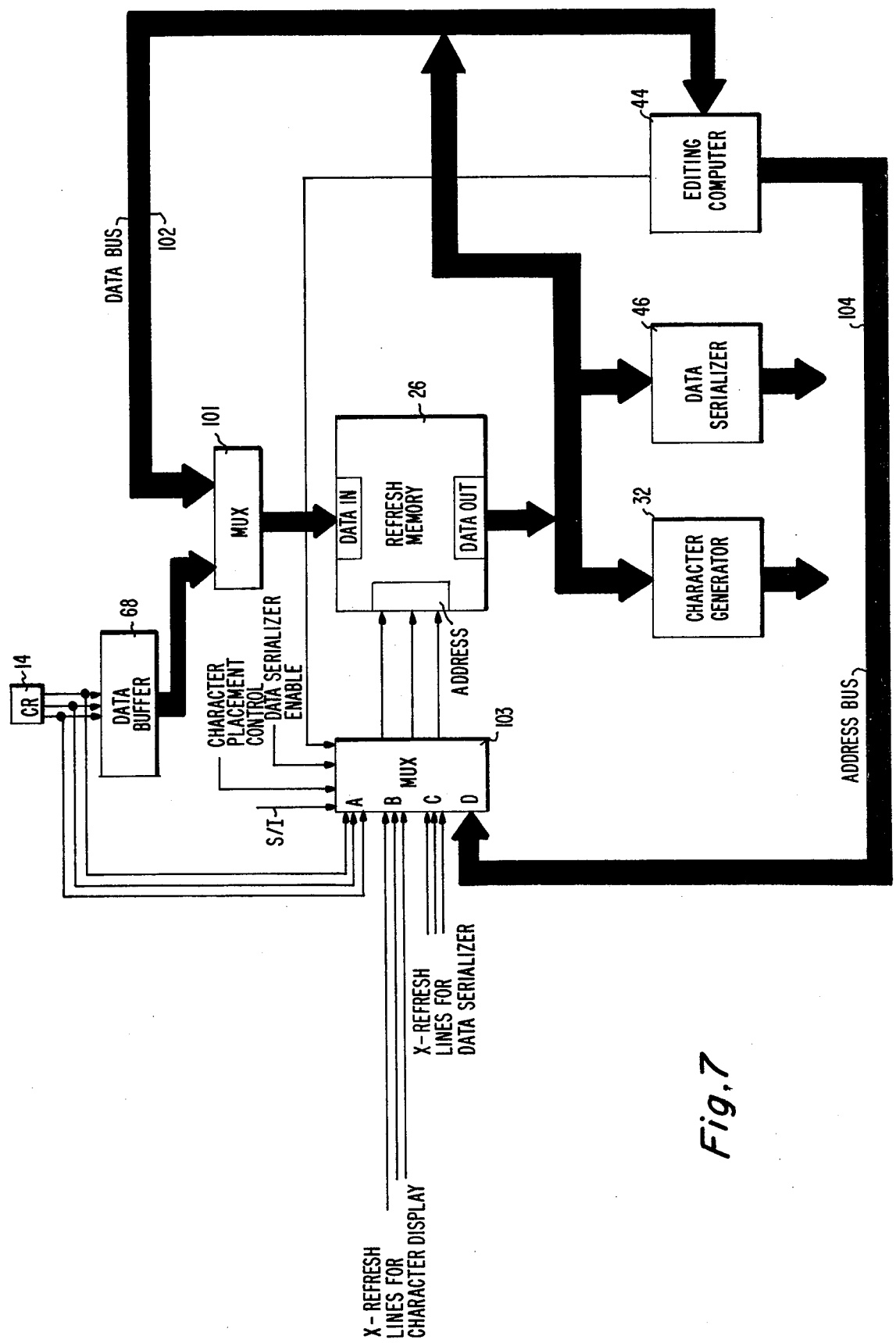
FIG. 7 is a schematic block diagram of a modification of the system of FIG. 1.

In FIG. 7, a modified refresh memory and data serializer control 46 are shown for operation with the editing computer 44. The refresh memory 26 receives data via a MUX 101 from a cash register through a data buffer 68. The other input to the MUX 101 is via a data bus 102 from the editing computer 44. There is also an address- generator MUX 103 which is similar to the MUX 70 referred to in the description of FIG. 2, MUX 103 has four sets of input lines to receive the data lines from the cash register, X-refresh lines for character display, X-refresh lines for the data serializer, and the address bus from the editing computer. The outputs of the refresh memory are directed via paths to the character generator 32 and the data serializer. In addition, the output from the refresh memory may be supplied to the data bus 102 of the editing computer 44 so that the latter may use the refresh memory for computation or other purposes.

The four controls for the address MUX 103 are: (1) The S/I signal passes the character digits from the cash register for the refresh memory addresses. This control to avoid loss of any of the cash register data can be adapted on a higher priority basis to the other controls. (2) The character placement control passes the X-refresh lines for the character display; this placement control comprises specified Y-counter outputs which determine the lines of the video frame at which the character display takes place. (3) The data serializer enable signal passes the X-refresh counter lines associated with the data serializer at the Y-counter output for the leader 50. (4) An address-enable signal from the editing computer 44 passes the memory address generated by it at times when the refresh memory is not otherwise addressed. In all other material respects, the modified system in FIG. 7 operates in a manner similar to that described above.

Figure 8:
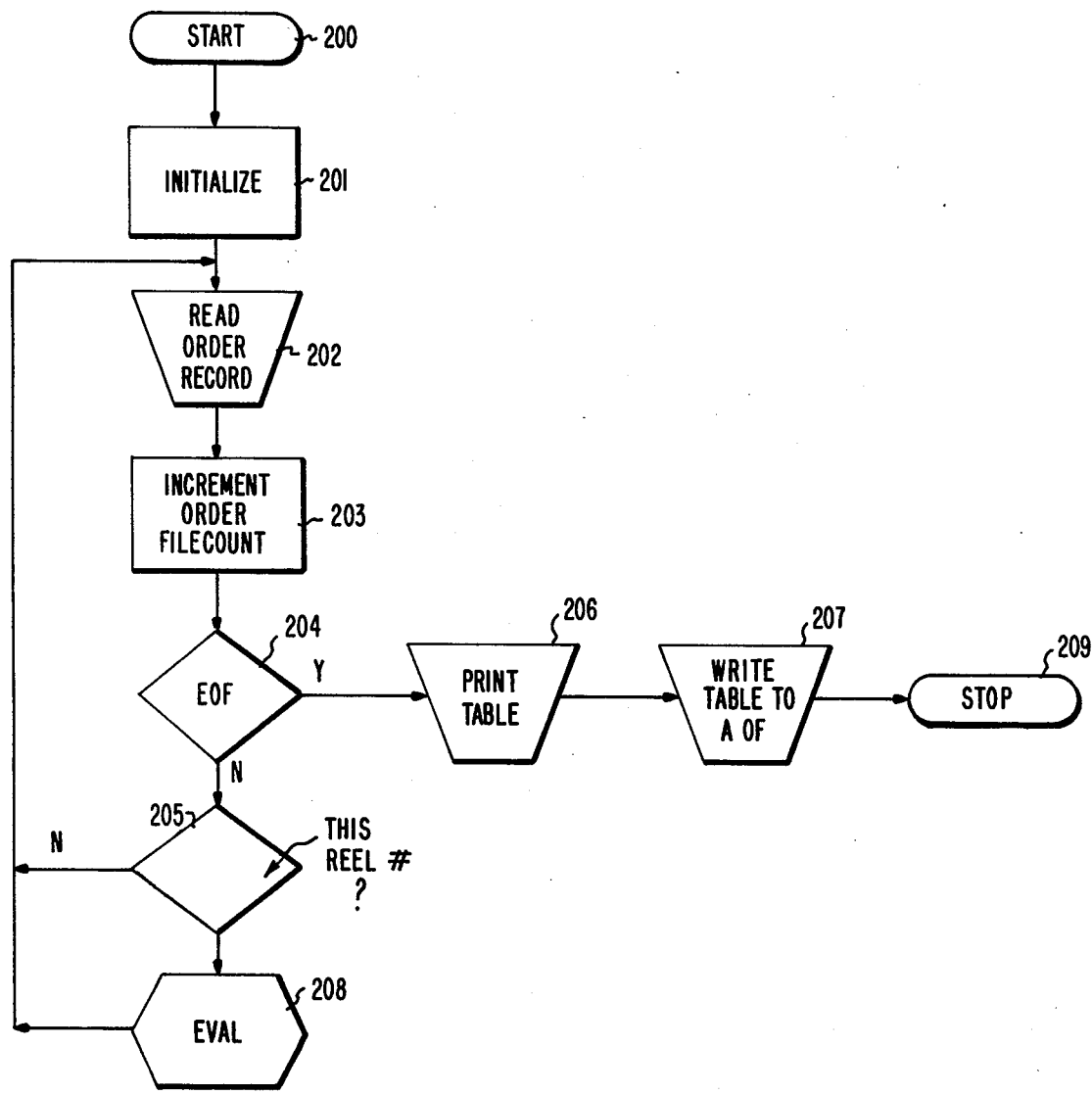
FIG. 8 is a schematic flow chart of an evaluation and editing computer of FIG. 1 or 7.
Figure 9:
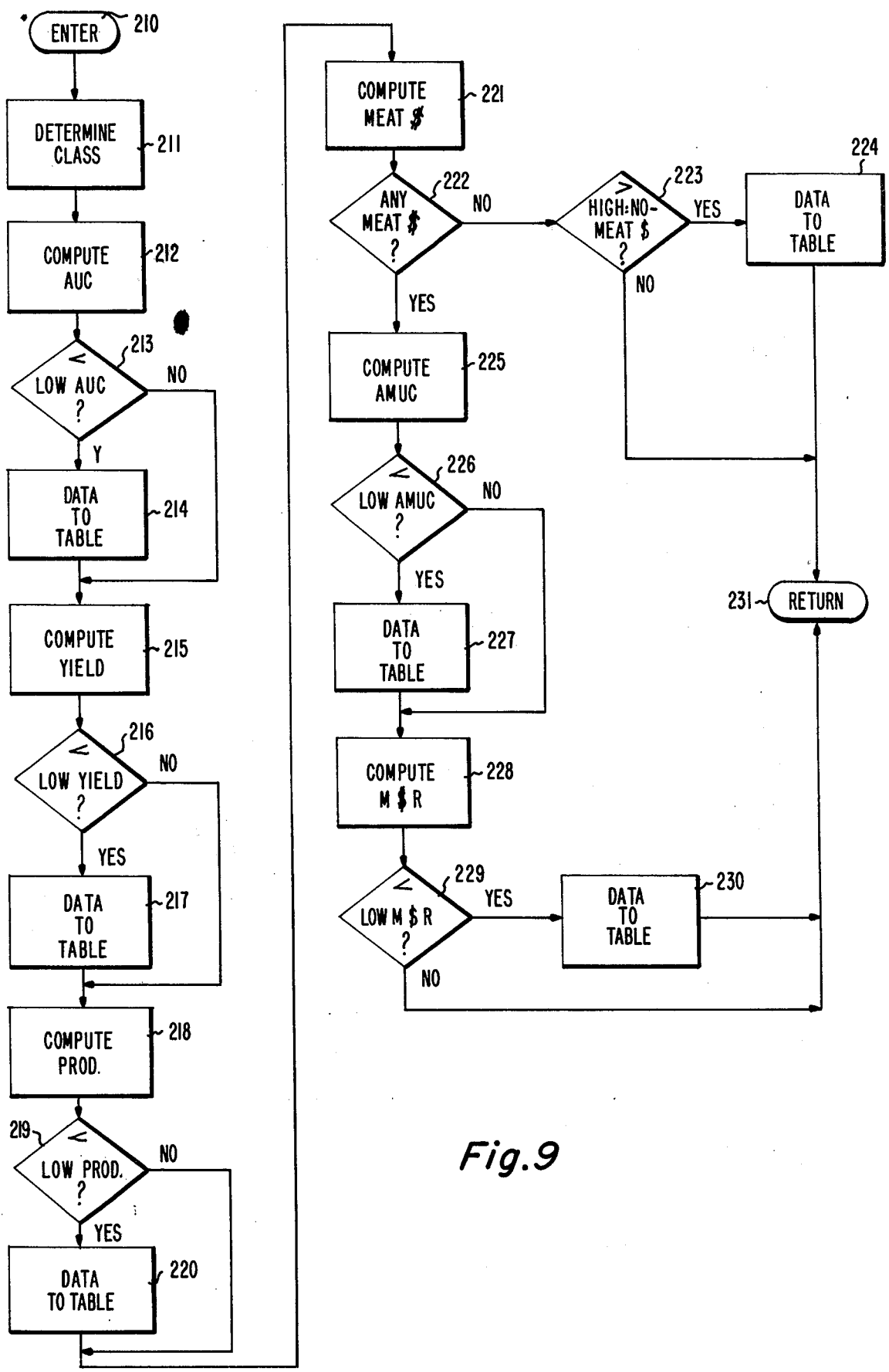
FIG. 9 is a schematic flow chart of a portion of the program of FIG. 8.

An evaluation control program (FIGS. 8 and 9) directs the operation of the editing computer 44 (FIG. 1 or 7) in a supermarket surveillance system. This particular program is an illustrative one that utilizes four evaluation criteria:

(A) average unit cost of items in an order,
(B) yield for the order (dollar total of order divided by time elapsed during ringing of order)
(C) productivity of the order (number of items in order divided by time elapsed during ringing of order)
(D) transactions for a given department (in this case meat).

Each criterion is compared with a predetermined value. If the comparison indicates that the value computed for one or more criteria for a given order is less than the predetermined value, the order is treated as an anomalous order; the order is entered in a separate table for each test which it fails. The information in the tables is written on an anamolous order file; it is also printed out for operator analysis.

The control program begins with a Start operation 200, and thereafter passes through a sequence of operations represented by blocks 201 through 209 that are sequentially performed under control of different portions of the program. Preset values are initialized 201 for each criteria applied in the evaluation subroutine 208 shown in detail in FIG. 9 (described below); also the record number of the first record in the order file is fetched so as to be evaluated. Thereafter, an order record is read 202, the order file count is incremented 203 and tested 204 to determine whether or not the end of the record file has been reached. If not, the number of the reel of tape is tested to determine whether or not it is the one on which the order to be evaluated was recorded. If not, another order record is read. If it is, the evaluation routine 208 is called and entered 210. After the entire order file has been processed as recognized by test 204, the data in the look-up table developed in the evaluation subroutine 208 is printed 206 and written 207 on an anomalous order file tape for use by the editing selector 52.

The evaluation routine 208 directs the following functions:

The number of items in the order is computed 211. If there are less than a predetermined number of items (e.g. 20 items) in the order it is flagged as a Class 1 order; otherwise it is flagged as a Class 2 order.

The average unit cost (AUC) of the items in the order is then computed 212, by dividing the dollar total for the order by the number of items.

The AUC is compared 213 with a predetermined value stored in the computer for this class of order for this cash register. If the AUC for the current order is less than the predetermined value the current order number and its associated AUC are stored 214 in the table for this class of order for this cash register. The yield for the order is then computed 215; that is, the program divides the dollar total by the elapsed time. This yield is compared 216 with a predetermined value for this class; the current order yield (along with the order number) is stored 217 if the current order yield is less than the test value.

Next the productivity of the order is computed 218 by dividing the number of items in the order by the elapsed time. The current order productivity is compared 219 with a predetermined test value for this class. If the current order productivity is less than the test value, the current order number and the corresponding productivity are stored in the table 220.

The total cost of all items which were rung up as meat department purchases is then computed 221. A test 222 is performed to ascertain if there were any such items. If there were none, test 223 is performed to determine if the total number of items in the order is greater than that expected in an order which does not contain any meat. If so, the order number is stored 224 in the no-meat table. If these were meat items rung up the computer calculates 225 the average meat unit cost (AMUC) for the order, by dividing the number of meat department items into the meat department total. The AMUC for the current order is then compared 226 with a predetermined test value for the class. If the current AMUC is less than the test value, the AMUC and associated order number are stored 227 in the table. Next the meat dollar ratio is computed 228 (MSR) by dividing the dollar amount rung as meat items in an order by the total dollar amount rung for the order. The MSR for the current order is compared 229 with a predetermined value for this class. If the current MSR is lower than the test value, the MSR and associated order number are stored 230 in the table.

After the MSR processing takes place, the control causes the computer to exit from the evaluation routine to return to the main stream of processing in order to read the next order record.

The test values utilized in the evaluation program can be developed in several different ways. The initial test values for each criteria can be based on educated guesses made by experts in the supermarket business or based on arbitrarily setting extremely high values for the criteria (except for the no meat test in which case a low value such as zero would be used). These initial values may then be refined empirically by substituting the current order value each time it is lower than the previously stored value (in the case of the no meat test the current value would be stored if it were higher than the previously stored value). It is also possible to refine the initial values by statistical methods (e.g. continually or periodically computing the average value of the particular criteria during a particular day's or week's operation and modifying the test values accordingly).

Thus a new and improved surveillance system is provided which is especially useful for surveillance of one or more point-of-sale transaction stations. The system is capable of storing video information which is edited in accordance with prescribed criteria.

What is claimed is:

1. A surveillance system for transaction stations comprising:
   a television camera for developing frames of video signals representative of transactions performed by a human operator at a transaction station;
   means including at least one operator-controlled device for developing digital electronic signals representing data entered by said operator at said transaction station about said transactions concurrently with the development of said video frames;
   a video display device for visually displaying image frames of said transactions corresponding to and from associated frames of composite signals;
   and means for generating a set of video character signals from said digital data signals of each of said transactions and for forming each of said frames of composite signals from one of said frames of video signals and a set of said character signals of the same transaction in a certain relation so that the associated character images are positioned on said display device in a certain location with relation to the associated image frames of said transaction.

2. A surveillance system as recited in claim 1 and further comprising:
   computer means responsive to said digital data signals representative of said transactions for selecting for display associated ones of said frames of video signals in accordance with preset selection criteria.

3. A surveillance system as recited in claim 2 and further comprising means for recording said digital data signals in association with said frames of video signals.

4. A surveillance system as recited in claim 1 wherein said television camera is operative for concurrently developing frames of video signals individually representative of operator performed transactions at a plurality of transaction stations;
   said digital data signal developing means includes a plurality of said operator-controlled devices individually associated with said transaction stations,
   and said generating means includes means for generating video character signals for each of said devices and for display of video characters in relation to the image of the associated one of said transaction stations.

5. A surveillance system for transaction stations comprising:
   a television camera for developing frames of video signals representative of transactions performed by a human operator at a transaction station;
   means including at least one operator-controlled device for developing digital electronic signals representing data entered by said operator at said transaction station about said transactions concurrently with the development of said video frames;
   a video display device for visually displaying image frames of said transactions;

and means operative in accordance with said digital data signals and certain preset criteria signals for selecting associated ones of said frames of video signals for display by said display device.

6. A surveillance system as recited in claim 5 and further comprising means including a video recorder for recording the selected ones of said video signal frames.

7. A surveillance system for transaction stations comprising:
a television camera for developing frames of video signals representative of transactions performed by a human operator at a transaction station;
means including at least one operator-controlled device for developing digital electronic signals representing data entered by said operator at said transaction station about said transactions concurrently with the development of said video frames;
a video recording device for recording image frames of said transactions;
and means operative in response to said digital data signals for selecting associated ones of said frames of video signals and for controlling the recording thereof by said recording device to produce an edited record of video frames.

8. A surveillance system as recited in claim 7 and further comprising means for recording edit-identification signals along with the associated video frames.

9. A surveillance system as recited in claim 8 and further comprising a video display device, and means responsive to said edit identification signals for controlling the display by said display device of the associated ones of said frames of video signals.

10. A surveillance system for transaction stations comprising:
a television camera for developing frames of video signals representative of transactions performed by a human operator at a transaction station;
means including at least one operator-controlled device for developing digital electronic signals representing data entered by said operator at said transaction station about said transactions concurrently with the development of said video frames;
a video display device for visually displaying image frames of said transactions;
means including a video recording device for recording image frames of said transactions and said digital data signals associated therewith;
and means operative in accordance with said recorded digital data signals and certain preset criteria signals for selecting associated ones for said recorded image frames for display by said display device.

* * * * *